Patented Jan. 26, 1937

2,068,974

UNITED STATES PATENT OFFICE 2,068,974

WATER-RESISTANT MOLDING MIXTURE AND METHOD OF MAKING THE SAME

Walter Brandenberg, Passaic, N. J., assignor to Heyden Chemical Corporation, New York, N. Y., a corporation of New York No Drawing. Application June 8, 1933, Serial No. 674,823

6 Claims. (Cl. 106—22)

This invention relates to a molding mixture and it particularly relates to a molding mixture comprising a product generated by a reaction between urea and formaldehyde, the object of the invention being to produce such a mixture in a suitable, preferably powdrous form, so that it will readily flow in the mold for producing molded articles.

By continued research in this field, I have found, that the manufacture of such a compound can be extremely simplified and that by observing the factors specified below I obtain a water-resistant molding powder answering the most exact requirements.

In the prior art the condensation product of urea and formaldehyde was first formed and was then usually in the form of a heavy syrup, mixed with the fibrous filler, whereupon the mixture was dried in any of the well known ways.

I have found that the resins of the ureaformaldehyde type are excellent binders, particularly with fibrous fillers, if in their conjunction with those fibrous fillers, such as wood flour, cotton flock, paper pulp, silk flock and like fibers of organic origin, a certain step is followed, namely: That the reaction between urea and formaldehyde takes place within the fiber. For this purpose the fibrous filler is first mixed with only one of the components forming the urea-formaldehyde resin. According to my experience it hardly makes any substantial difference in the result which of the components is first mixed with the fibrous filler.

In addition I may say that this operation may be done in any agitating device, which can be put under vacuum, as it is known that the air in such fine masses as wood flour prevents a liquid from fully penetrating the pores of the fiber. Contrary to the prior art I do not apply any heating during the reaction. I have observed that even any exothermic heat developed by the reaction has to be suppressed by cooling.

Example

One part of filler, such as wood flour, and two parts of formaldehyde, of the commercial type, are introduced into a kneading machine and preferably put under vacuum. Then one part of urea in a finely powdered form or in a concentrated solution is added and the mass thoroughly mixed. Care is taken that there is no rise above the original temperature of the ingredients. The kneading device should therefore be jacketed as to admit a cooling agent. Then the mass is put at once into a well ventilated drying chamber, where it is dried best under agitating at a low temperature. Instead of first adding the formaldehyde to the filler, I can add first the urea to the filler and then the formaldehyde.

Furthermore, I wish to say that I do not wish to be restricted to the amount of the ingredients mentioned in the example and that I may apply any amount of urea and formaldehyde yielding resins, and that I may apply formaldehyde of any pH value.

What I claim is:

1. The method of preparing molding mixtures containing a resin of the urea-formaldehyde type, said method consisting in mixing one component of said resin to the fibrous filler, adding to the aforesaid mixture the other component under cooling, and drying the obtained final mixture.

2. The method of preparing molding mixtures containing a resin of the urea-formaldehyde type, said method consisting in mixing to the fibrous filler formaldehyde, adding to the mixture thus obtained urea under cooling, and drying the obtained final mixture.

3. The method of preparing molding mixtures containing a resin of the urea-formaldehyde type, said method consisting in mixing to substantially one part of a fibrous filler two parts of formaldehyde, adding to the mixture thus obtained urea under cooling, and drying the thus obtained final mixture.

4. The method of preparing molding mixtures containing a resin of the urea-formaldehyde type, said method consisting in mixing urea with a fibrous filler, adding to the mixture thus obtained substantially two parts of formaldehyde under cooling, and drying the thus obtained final mixture.

5. The method of preparing molding mixtures containing a resin of the urea-formaldehyde type, said method consisting in mixing one component of said resin to the fibrous filler, adding to the aforesaid mixture the other component, and dissipating all exothermic heat created by the reaction.

6. The method of preparing molding mixtures containing a resin of the urea-formaldehyde type, said method consisting in mixing one component of said resin to the fibrous filler under vacuum, adding to the aforesaid mixture the other component, and dissipating the exothermic heat created by the reaction.

WALTER BRANDENBERG.